(12) United States Patent
Munakata

(10) Patent No.: US 6,373,540 B1
(45) Date of Patent: Apr. 16, 2002

(54) REFLECTIVE GUEST HOST LIQUID CRYSTAL DEVICE

(75) Inventor: Masaki Munakata, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/040,991

(22) Filed: Mar. 19, 1998

(30) Foreign Application Priority Data

Mar. 21, 1997 (JP) ............................................. 9-087748

(51) Int. Cl.⁷ ..................... G02F 1/1335; G02F 1/3333; G02F 1/136
(52) U.S. Cl. ....................... 349/117; 349/110; 349/113; 349/44
(58) Field of Search ................................. 349/117, 113, 349/106, 110, 44

(56) References Cited

U.S. PATENT DOCUMENTS

| 5,500,750 A | * 3/1996 | Kanbe et al. .................. 359/58 |
| 5,699,135 A | * 12/1997 | Hisatake et al. ............ 349/113 |
| 5,734,456 A | * 3/1998 | Takao et al. ................. 349/106 |
| 5,777,707 A | * 7/1998 | Masaki et al. ............... 349/110 |
| 5,828,434 A | * 10/1998 | Koden et al. ................ 349/148 |
| 5,926,242 A | * 7/1999 | Kataoka et al. ............. 349/117 |
| 6,016,178 A | * 1/2000 | Kataoka et al. ............. 349/117 |
| 6,061,111 A | * 5/2000 | Kataoka et al. ............. 349/113 |
| 6,124,911 A | * 9/2000 | Nakamura et al. .......... 349/113 |

* cited by examiner

Primary Examiner—William L. Sikes
Assistant Examiner—Mike Qi
(74) Attorney, Agent, or Firm—Sonnenschein, Nath & Rosenthal

(57) ABSTRACT

A reflective guest-host-liquid-crystal display device includes: first and second substrates jointed to each other, with a predetermined gap provided therebetween; and guest-host liquid crystal including a dichroic dye, held in the gap. The first substrate includes: switching devices; a light-reflection layer; a quarter-wavelength-plate layer, formed above the switching devices and the light-reflection layer, having a contact hole in conduction with the switching devices; pixel electrodes, formed by patterning the surface of the quarter-wavelength-plate layer, connected to the switching devices by the contact hole; and a light-shielding black matrix formed along the border of each pixel electrode. The second substrate has a counter electrode formed on the outer surface thereof.

4 Claims, 7 Drawing Sheets

REFLECTIVE GUEST HOST LIQUID CRYSTAL DEVICE

BACKGROUND OF THE INVENTION

1. Field of the Invention

The present invention relates to reflective guest-host-liquid-crystal display devices, and in particular, to techniques for improving efficiency of the use of incident light by using a quarter-wavelength-plate layer and a light-reflection layer, both built into a reflective guest-host-liquid-crystal display device. In more particular, the present invention relates to the structure of a black matrix for shielding light in the peripheries of pixels.

2. Description of the Related Art

A reflective guest-host-liquid-crystal display device including a quarter-wavelength-plate and a light-reflection layer is disclosed in, for example, Japanese Unexamined Patent Publication No. 6-222351, and its section view is shown in FIG. 4. The reflective guest-host-liquid-crystal display device 101 includes a pair of upper and lower substrate 102 and 103, guest-host liquid crystal 104, a dichroic dye 105, a pair of upper and lower transparent electrodes 106 and 110, a pair of upper and lower alignment layers 107 and 111, a light-reflection layer 108, and a quarter-wavelength-plate layer 109. The pair of substrates 102 and 103 is composed of insulating material such as glass, quartz or plastic. At least, the upper substrate 102 is transparent. The guest-host liquid crystal 104, which includes the dichroic dye 105, is held between the pair of substrates 102 and 103. The guest-host liquid crystal 104 includes nematic liquid crystal molecules 104a. The dichroic dye 105 is so-called "p-type dye" having transition dipole moments almost parallel to the major axes of its molecules. On the inner surface 102a of the upper substrate 102 are formed switching devices (not shown). The transparent substrates 106 are patterned in a matrix to form pixel electrodes, which are driven by the corresponding switching devices. The outer surface of the upper substrate 102 is coated with the alignment layer 107, which is composed of polyimide resin. The surface of the alignment layer 107 is processed, for example, by rubbing, and horizontally aligns the nematic liquid crystal molecules 104a.

In addition, the light-reflection layer 108, which is composed of aluminum, and the quarter-wavelength-plate layer 109, which is composed of high-molecular liquid crystal, are formed in the order given on the surface 103a of the lower substrate 103. The transparent electrodes 110 and the alignment layer 111 are formed in the order given on the quarter-wavelength-plate layer 109.

Subsequently, the operation of the reflective guest-host-liquid-crystal display device 101 when performing monochrome display will be briefly described.

When no voltage is applied, the nematic liquid crystal molecules 104a align horizontally, and the dichroic dye 105 aligns similarly. When light incident from the upper substrate 102 travels into the guest-host liquid crystal 104, components of the incident light having an oscillating plane parallel to the major axes of the molecules of the dichroic dye 105 are absorbed by the dichroic dye 105. Other components having an oscillating plane vertical to the major axes of the molecules of the dichroic dye 105 pass through the guest-host liquid crystal 104, and are circularly polarized by the quarter-wavelength-plate layer 109 formed over the inner surface 103a of the lower substrate 103. The circularly polarized components are reflected by the light-reflection layer 108. At this time, the reflected light is polarized in the reverse direction, and passes through the quarter-wavelength-plate layer 109 again to form components having a polarizing plane parallel to the major axes of the molecules of the dichroic dye 105. The formed components are absorbed in the dichroic dye 105, which generates almost completely black display.

In addition, when a voltage is applied, the nematic liquid crystal molecules 104a align vertically along the direction of the electric field, and the dichroic dye 105 aligns similarly. Light incident from the upper substrate 104 passes through the guest-host liquid crystal 104 without being absorbed in the dichroic dye 105, and is reflected by the light-reflection layer 108 without being substantially affected by the quarter-wavelength-plate layer 109. The reflected light passes through the quarter-wavelength-plate layer 109 again to be emergent without being absorbed in the guest-host liquid crystal 104, which generates white display.

According to the conventional structure shown in FIG. 4, the switching devices for driving the pixels are formed on the emergent-side substrate. The switching devices consist of thin film transistors. The switching devices shield the incident light, which reduces the aperture ratio of the pixels by the amount of the shielding. To cope with this point, there has been developed a structure in which switching devices are formed on the reflection-side substrate, whose example is shown in FIG. 5. As shown in FIG. 5, an upper substrate 201 has a counter electrode 203a totally formed thereon, which consists of a transparent electrode, and a lower substrate 202 has pixel electrodes 204a consisting of a matrix of segmented reflector electrodes. In other words, this example is an active matrix type. On the outer surface of the lower substrate 202, the pixel electrodes 204a, which are patterned in a matrix, and the thin film transistors (TFTs) corresponding thereto are formed. The TFTs are used as switching devices for respectively driving the pixel electrodes 204a. In other words, by selectively switching the TFTs, a signal voltage can be written into the corresponding TFTs. The drain region D of each TFT is connected to the pixel electrode 204a. The source region S thereof is connected to a signal interconnection 221. The gate electrode G thereof is connected to a gate interconnection. An auxiliary capacitor Cs is formed to correspond to each pixel electrode 204a. The pixel electrode 204a is electrically separated by a planarizing layer 222 from the TFT, the auxiliary capacitor Cs and the signal interconnection 221. On the outer surface of the upper substrate 201 is totally formed the counter electrode 203a. An electro-optical material 205 is held between both substrates 201 and 202, which are opposed, with a predetermined gap provided therebetween. The electro-optical material 205 has a layered structure including guest-host liquid crystal 206 and a quarter-wavelength-plate layer 207. The guest-host liquid crystal 206 contains nematic liquid crystal molecules 209 and dichroic dye 208, and are horizontally aligned by upper and lower alignment layers 210 and 211. The quarter-wavelength-plate layer 207 is formed along the pixel electrode 204a.

Writing the signal voltage to the pixel electrode 204a generates an electric field between it and the opposing counter electrode 203a, which changes the guest-host liquid crystal 206 between its absorbing condition and its transparent condition. This optical change is generated for each pixel electrode, which enables the displaying of the desired image. Below the pixel electrode 204a are positioned the TFT, the auxiliary capacitor Cs and the signal interconnection 221. There are not these component parts in the incident optical path, which does not affect the pixel aperture ratio. In other words, the area of the pixel electrode 204a can be totally used as the pixel aperture, which enables bright display.

The above-described reflective guest-host-liquid-crystal display device uses exterior light like natural light without using a backlight for back lighting. Thus, in order to obtain the bright image, the aperture ratio of pixels needs to be increased. Concerning this point, the structure shown in FIG. 5 enables a sufficient pixel aperture ratio, as described above. In addition, when color display is performed in the structure shown in FIG. 5, three-primary-color filters corresponding to each pixel is provided on the counter substrate 201. Improving the contrast of the color display requires provision of a black light-shield (black matrix) along the border of each pixel. A conventional black matrix is provided on a counter substrate, similar to the color filter. This structure requires the precise alignment of the black matrix-formed counter substrate 201 and the TFT-formed substrate 202. The mechanical precision has a limit, which generates, to some extent, an error in the alignment. In order to absorb this error, the width of the black matrix is designed slightly broad. The aperture ratio deteriorates by the amount of the broadening.

SUMMARY OF THE INVENTION

Accordingly, it is an object of the present invention to provide a reflective guest-host-liquid-crystal display device for solving the foregoing problem in which a quarter-wavelength-plate layer and a light-reflection layer are included so that incident light is effectively used.

To this end, the foregoing object has been achieved through provision of a reflective guest-host-liquid-crystal display device including: first and second substrates jointed to each other, with a predetermined gap provided therebetween; and guest-host liquid crystal including a dichroic dye, the guest-host liquid crystal held in the gap, in which the first substrate includes: switching devices; a light-reflection layer; a quarter-wavelength-plate layer, formed above the switching devices and the light-reflection layer, having a contact hole in conduction with the switching devices; pixel electrodes, formed by patterning the surface of the quarter-wavelength-plate layer, connected to the switching devices by the contact hole; and a light-shielding black matrix formed along the border of each pixel electrode, and the second substrate has a counter electrode formed on the outer surface thereof.

Preferably, the light-reflection layer consists of a light-shielding resin film having irregularities formed on one surface; and a reflective metal film on the light-shielding resin film, corresponding to the pixel electrodes, and the black matrix is included in the light-shielding resin film.

The light-shielding resin film may be a photosensitive resin film having a black pigment or dye added therein.

The gap between the light-reflection layer and the quarter-wavelength-plate layer may be filled with a planarizing layer.

The planarizing layer may be colored so as to correspond to each pixel electrode, whereby functioning as a color filter.

According to the present invention, a so-called "on-chip" structure is employed. This enables the precise alignment of a black matrix and color filters with pixel electrodes, which can provide a sufficient pixel aperture ratio. The on-chip structure eliminates the need of the precise alignment of a counter electrode-formed substrate and a pixel electrode-formed substrate. Accordingly, the black matrix does not need to have a margin of error.

DESCRIPTION OF THE PREFERRED EMBODIMENTS

One embodiment of the present invention will be described with reference to the attached drawings.

Figure 1A:
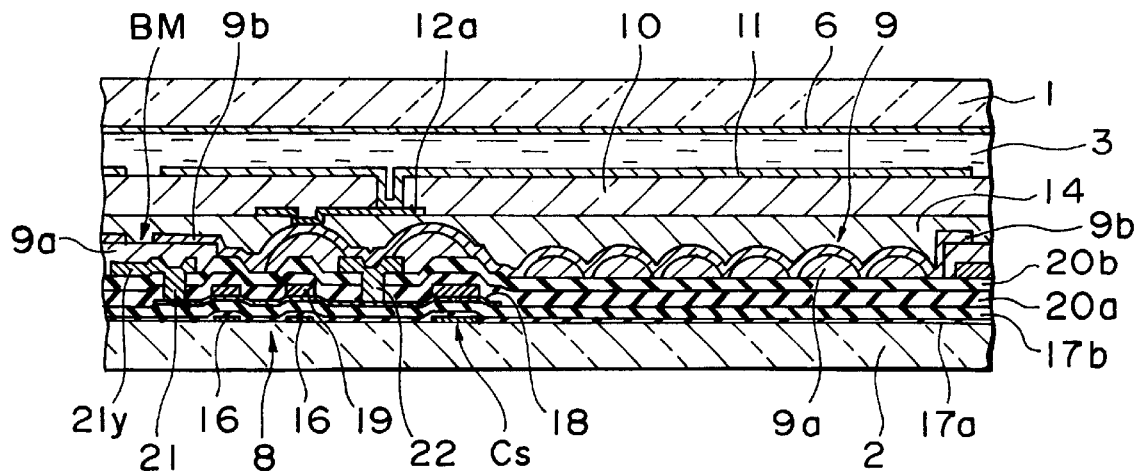
FIGS. 1A and 1B are a section view and a plan view showing the basic structure of a reflective guest-host-liquid-crystal display device according to the present invention.
Figure 1B:
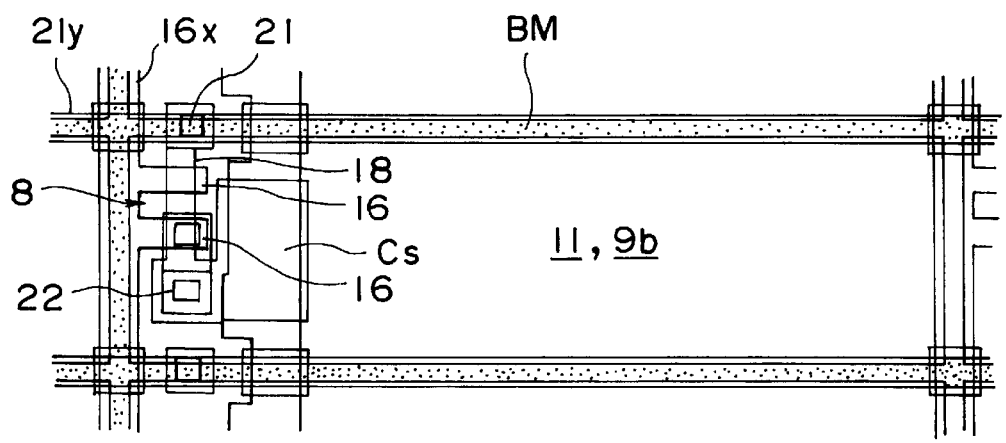
Figure 4:
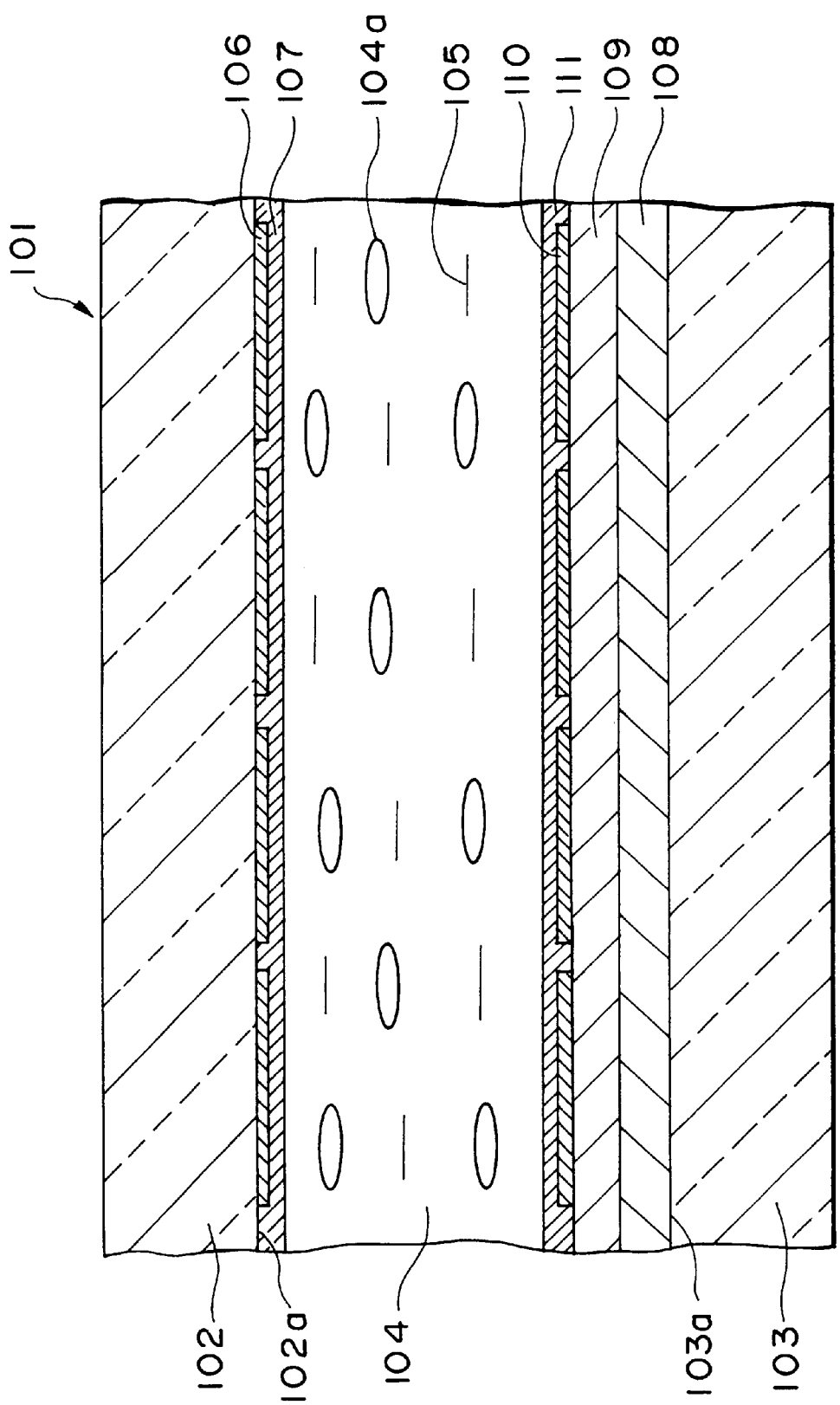
FIG. 4 is a section view showing one example of a conventional reflective guest-host-liquid-crystal display device.
Figure 5:
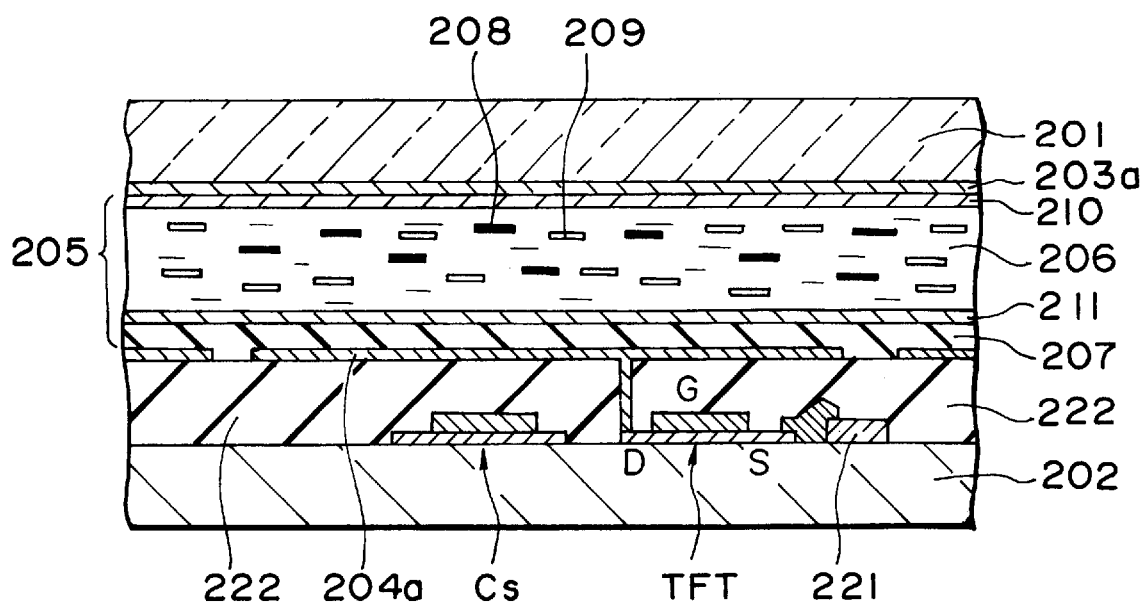
FIG. 5 is a section view showing another example of the conventional reflective guest-host-liquid-crystal display device.

FIGS. 1A and 1B show the basic structure of a reflective guest-host-liquid-crystal display device according to the present invention. FIG. 1A shows a section view of one pixel, and FIG. 1B shows a plan view of one pixel. As shown in FIG. 1A, the reflective guest-host-liquid-crystal display device includes a pair of upper and lower substrates 1 and 2 joined to each other, with a predetermined gap provided between them. The upper substrate 1 is positioned on the incident side, and is composed of transparent material like glass. The lower substrate is positioned on the emergent side, and does not always need to be composed of a transparent substrate. In the gap between the pair of substrates 1 and 2, guest-host liquid crystal 3 is held. The guest-host liquid crystal 3 contains nematic liquid-crystal molecules having, for example, negative dielectric anisotropy, and includes a dichroic dye in a predetermined ratio. On the outer surface of the upper substrate 1, there are formed a counter electrode 6 and an alignment layer (not shown). The counter electrode 6 is composed of, for example, a polyimide film, and vertically aligns the guest-host liquid crystal 3. The present invention is not limited to the vertical alignment, but the guest-host liquid crystal 3 may be horizontally aligned, as shown in FIGS. 4 and 5. According to this embodiment, when no voltage is applied, the guest-host liquid crystal 3 is vertically aligned, and when a voltage is applied, the guest-host liquid crystal 3 is horizontally aligned.

The lower substrate 2 is provided with, at least, one switching device composed of a thin film transistor 8, a light-reflection layer 9, a quarter-wavelength-plate layer 10, and one pixel electrode 11. The quarter-wavelength-plate layer 10 is formed above the thin film transistor 8 and the light-reflection layer 9, and a contact hole is formed in it. The pixel electrode 11 is patterned on the quarter-wavelength-plate layer 10, which enables the application of a sufficient electric field to the guest-host liquid crystal 3 between the pixel electrode 11 and the counter electrode 6. The pixel electrode 11 is electrically connected by the contact hole formed in the quarter-wavelength-plate layer 10 to the thin film transistor 8. One feature of the present invention is that the lower substrate 2 is provided with a light-shielding black matrix BM along the border of each pixel electrode 11. The light-reflection layer 9 has a layered structure composed of a resin film 9a and a metal film 9b. The resin film 9a is formed to have an irregular surface, and has a light-shielding property. The metal film 9b is formed on the resin film 9a, with its shape adjusted to the pixel electrode 11. According to this embodiment, part of the resin film 9a is used to form the above-described black matrix BM. The resin film 9a is, for example, a photosensitive resin film having a black pigment or dye added therein. There is a planarizing layer 14 for filling irregularities between the light-reflection layer 9 and the quarter-wavelength-plate layer 10. The planarizing layer 14 is colored so as to correspond to each pixel electrode 11, and functions as a color filter. As described above, the present invention employs a so-called "on-chip structure" in which the black matrix BM and color filters are formed on the side of the lower substrate 2 on which pixel electrodes 11 and thin film transistors 8 are formed.

According to the present invention, the irregular resin film 9a itself, included in the light-reflection layer 9, which scatters light, is colored black so as to have a light-shielding property. By using part of the black resin film 9a as the black matrix BM, the black-matrix on-chip structure is realized. On the surface of the black resin film 9a is formed the metal film 9b, which is composed of aluminum etc. and reflects light. The metal film 9b is formed in a pattern identical to that of the pixel electrode 11 positioned above. Accordingly, in an opening defined by the pixel electrode 11, the black resin film 9a is completely covered with the metal film 9b, and cannot be observed from the exterior. In other words, in the opening, only the metal film 9b having irregularities can be observed. As shown in FIG. 1A, part of the black resin film 9a extends even between two pixel electrodes 11. On this part, the metal film 9b is not formed. This makes it possible to observe the black resin film 9a between two adjacent pixel electrodes 11, so that the black matrix BM is formed as shown in FIG. 1B. In other words, the black matrix BM is formed in the shape of a lattice so as to surround each pixel electrode 11. The unit width of the black matrix BM is defined by the pattern of the metal film 9b, and can be accurately controlled. In other words, the patterning precision of the black matrix BM is determined by the pattern precision of the metal film 9b, and is not dependent on the pattern precision of the black resin film 9a at all. In this manner, according to the present invention, the pixel aperture ratio is substantially defined by the pattern precision of the metal film 9b. As shown in FIG. 1B, gate interconnections 16X and signal interconnections 21y are formed below the lattice-shaped black matrix BM. The resin film 9a is composed of a photosensitive resin film like a photoresist etc. and looks black. The photoresist may be either a negative type or a positive type. In order to black a photoresist, for example, a black dye or pigment is added to a photoresist material in advance. Otherwise, with a transparent photoresist patterned in a predetermined shape, it may be colored black by using a dye etc. According to the circumstances, with a transparent photoresist patterned in a predetermined shape, it may be heated to be black. In addition, each planarizing layer 14 is colored so as to correspond to each pixel electrode 11, and functions as a red, green or blue color filter or a yellow, magenta or cyan color filter. The color filter also has an on-chip structure, which does not cause deterioration in the pixel aperture ratio. The color filter can be formed by coloring techniques. Otherwise, printing techniques may be used. Moreover, a photoresist in which a dye or pigment is dispersed may be used to form the color filter. By forming the black matrix BM and color filters, which have on-chip structures, on the side of the lower substrate 2, it is only required that the counter electrode 6 be formed on the upper substrate 1. This eliminates the need for considering the joining precision of the pair of upper and lower substrates 1 and 2.

Referring further to FIGS. 1A and 1B, each component will be specifically described. According to this embodiment, the quarter-wavelength-plate layer 10 is composed of a high-molecular liquid-crystal film which is uniaxially aligned. In order that the high-molecular liquid-crystal film may be uniaxially aligned, in general, an undercoat alignment layer (not shown) is used. There is the planarizing layer 14 for filling the irregularities of the thin film transistor 8 and the light-reflection layer 9, and the above-described undercoat alignment layer is formed on the planarizing layer 14. The quarter-wavelength-plate layer 10 is also formed on the planarizing layer 14. In this case, the pixel electrode 11 is connected to the thin film transistor 8 by the contact hole formed in the quarter-wavelength-plate layer 10 and the planarizing layer 14, and an intermediate electrode 12a. The light-reflection layer 9 is separated into smaller portions so as to correspond to the respective pixel electrodes 11. Each smaller portion is connected to the corresponding pixel electrode 11 at an identical potential. In this arrangement, an unnecessary electric field is not applied to the quarter-wavelength-plate layer 10 and the planarizing layer 14 positioned between the light-reflection layer 9 and the pixel electrode 11. The light-reflection layer 9 has a light-scattering reflecting surface as shown in FIG. 1A, which prevents the mirror reflection of incident light to improve image quality. The thin film transistor 8 has a bottom-gate structure in which gate electrodes 16, a layer composed of gate insulating films 17a and 17b, and a semiconductor film 18 are sequentially formed on the substrate 2 in the order given. The semiconductor film 18 is composed of, for example, polycrystal silicon. A channel region adjusted to the gate electrodes 16 is protected by a stopper 19 positioned upward. According to the present invention, the thin film transistor 8 has a double-gate structure in which two gate electrodes are used. Instead, a single-gate structure may be employed. The thin film transistor 8, which is a bottom-gate type having the above-described structure, is coated with two interlayer insulating films 20a and 20b. In the interlayer insulating films 20a and 20b, a pair of contact holes is formed, by which a source electrode 21 and a drain electrode 22 are electrically connected to the thin film transistor 8. The source electrode 21 is included in the above-described signal interconnection 21y. The drain electrode 22 has an electric potential identical to that of the light-reflection layer 9. The pixel electrode 11 is electrically connected to the drain electrode 22 by the intermediate electrode 12a and the light-reflection layer 9. The source electrode 21 is supplied with a signal voltage via the signal interconnection 21y. In this embodiment, an auxiliary capacitor Cs having the same structure as the thin film transistor 8 is also formed.

Next, a process for producing a reflective guest-host-liquid-crystal display device according to the present invention will be specifically described with reference to FIGS. 2A to 2D, 3A to 3J, 4, and 5. For easy understanding, the process will be described in the form in which the structure shown in FIGS. 1A and 1B is further simplified.

Figure 2A:
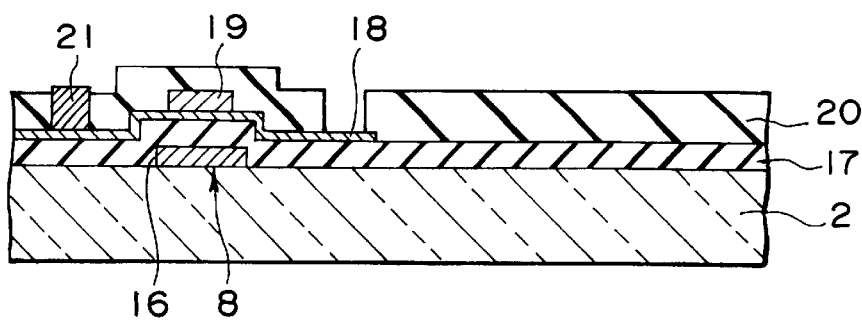
FIGS. 2A to 2D are process charts showing the process of producing a reflective guest-host-liquid-crystal display device according to the present invention.

As shown in the step shown in FIG. 2A, thin film transistors 8 are formed on the surface of an insulating substrate 2. Specifically, a high-melting-point metal film is formed on the substrate 2 before the film is patterned in a predetermined shape to form each gate electrode 16. By using chemical vapor deposition (CVD) or the like, silicon oxide or silicon nitride is deposited to form each gate insulating film 17 for covering the gate electrodes 16. Subsequently, by using CVD or the like, a semiconductor thin film 18 composed of a polycrystal-silicon thin film is formed on the gate insulating film 17. The semiconductor thin film 18 is patterned in an insular shape so as to correspond to the shape of the device region of the thin film transistor 8. Each stopper 19 composed of silicon oxide etc. is formed by patterning on the semiconductor thin film 18 so as to correspond to the gate electrode 16. By using the stopper 19 as a mask, ion doping or ion implantation is used to dope impurities into the semiconductor thin film 18. This provides the thin film transistor 8, which has a bottom-gate structure. The present invention is not limited to a thin film transistor having a bottom-gate structure. However, a thin film transistor having a top-gate structure may be used as a switching device, in place of the thin film transistor having a bottom-gate structure. Otherwise, a two-terminal device such as a metal-insulator-metal capacitor may be used in place of the thin film transistor. PGS etc. are deposited to form an interlayer insulating film 20 for covering the thin film transistor 8. A contact hole is formed in the interlayer insulating film 20 before aluminum etc. are deposited on the whole of the interlayer insulating film 20. The aluminum-deposited film is patterned in a predetermined shape to form a source electrode 21 and a signal interconnection. As shown in FIG. 2A, the source electrode 21 is electrically connected to the source region of the thin film transistor 8 by the contact hole.

Figure 2B:
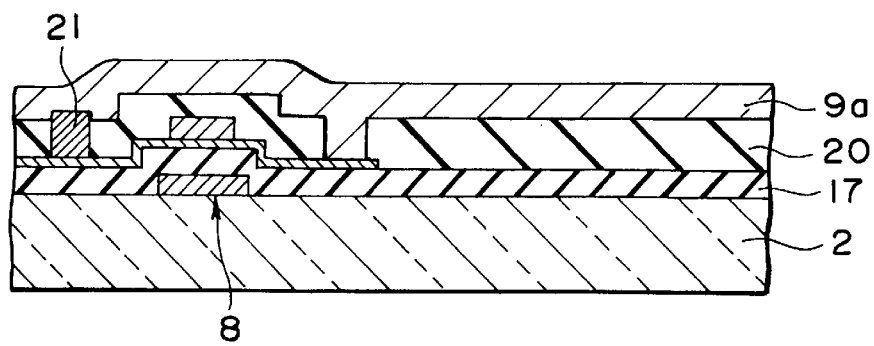

The process proceeds to the step shown in FIG. 2B, in which a photosensitive resin film 9a is applied to the whole surface of the interlayer insulating film 20. The photosensitive film 9a may be composed of, for example, a photoresist. The photoresist is provided with a light-shielding property since it has a black pigment or dye previously added.

Figure 2C:
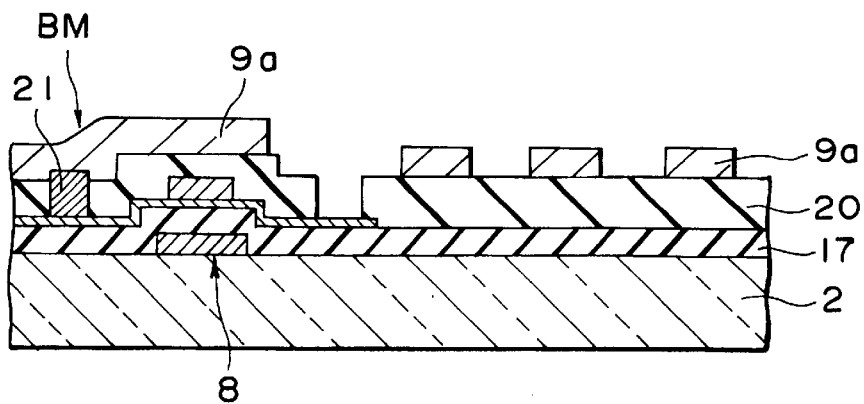

The process proceeds to the step shown in FIG. 2C, in which a predetermined mask is used to expose the photoresist, whereby the resin film 9a is patterned to have discrete columnar shapes. In this patterning, part of the resin film 9a functioning as a black matrix BM is also left.

Figure 2D:
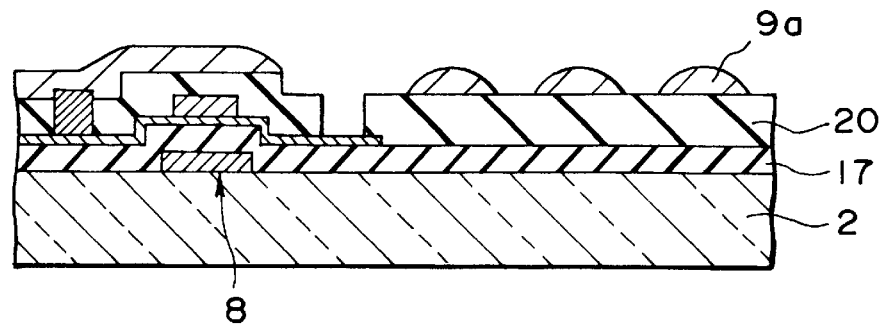

The process proceeds to the step shown in FIG. 2D, in which the insulating substrate 2 is heated to perform the reflow of the resin film 9a. The reflow gradually changes the shapes of the photoresist, which provides the desired irregularities.

Figure 3A:
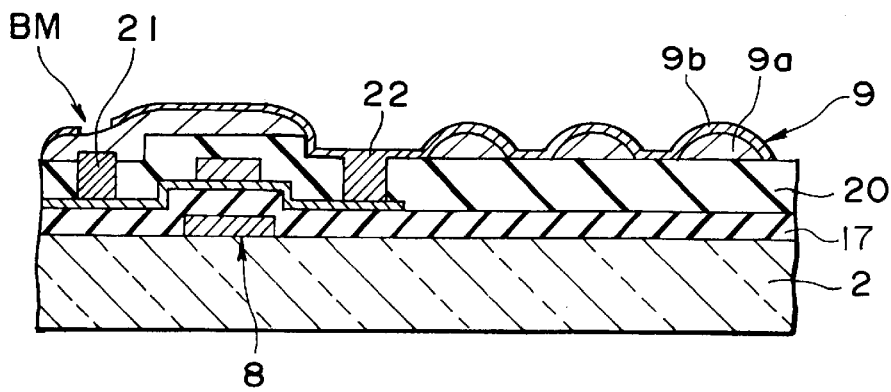
FIGS. 3A to 3J are further process charts showing the process of producing the reflective guest-host-liquid-crystal display device, shown in FIGS. 2A to 2D, according to the present invention.

The process proceeds to the step shown in FIG. 3A, in which a metal film 9b composed of aluminum etc., having a preferable reflectance, is formed on the irregularities of the resin film 9a by vacuum deposition or the like so as to have the desired thickness. By setting the depth of the irregularities at several micrometers, the metal film 9b can obtain a preferable light-scattering property, and becomes white. The metal film 9b is patterned in a predetermined shape to form a light-reflection layer 9 corresponding to each pixel electrode. Simultaneously, the metal layer 9b is removed from the surface of signal interconnection including the source electrode 21 to form the black matrix BM. Then, the drain electrode 22 of the thin film transistor 8 is also formed with the metal film 9b. From FIG. 3A, it is clear that the metal film 9b has an electric potential identical to that of the drain electrode 22.

Figure 3B:
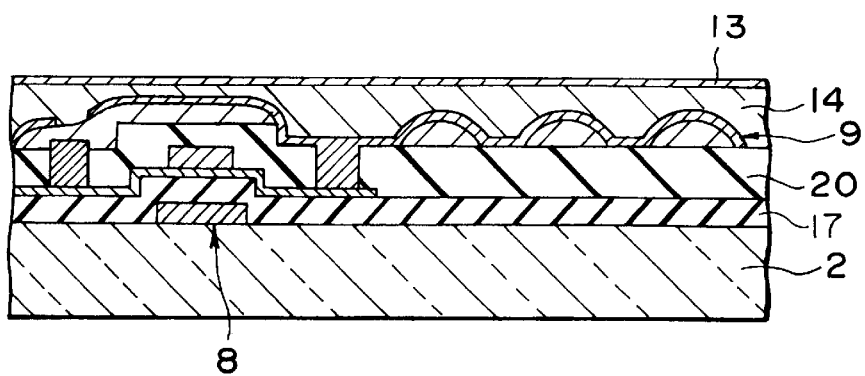

The process proceeds to the step shown in FIG. 3B, in which a planarizing layer 14 is formed on the light-reflection layer 9 to fill the irregularities. In this embodiment, the planarizing layer 14 is composed of photoresists colored red, green and blue. Initially, a photoresist colored red is applied to fill the irregularities by spin coating. The patterning of this photoresist so as to correspond to the light-reflection layer 9 is performed to form a red color filter. In addition, by repeatedly performing the same step with green and blue photoresists, red, green and blue color filters are provided.

The process proceeds to the formation of a quarter-wavelength-plate layer 10. An undercoat alignment layer 13 is formed on the planarizing layer 14. High-molecular liquid crystal is applied to the undercoat alignment layer 13, and is uniaxially aligned to form the quarter-wavelength-plate layer 10. At this time, the existence of the planarizing layer 14 causes the stable formation and rubbing of the undercoat alignment layer 13. The undercoat alignment layer is composed of, for example, a polyimide film, and is rubbed along a predetermined direction. According to the circumstances, the surface of the planarizing layer 14 is directly rubbed.

Figure 3C:
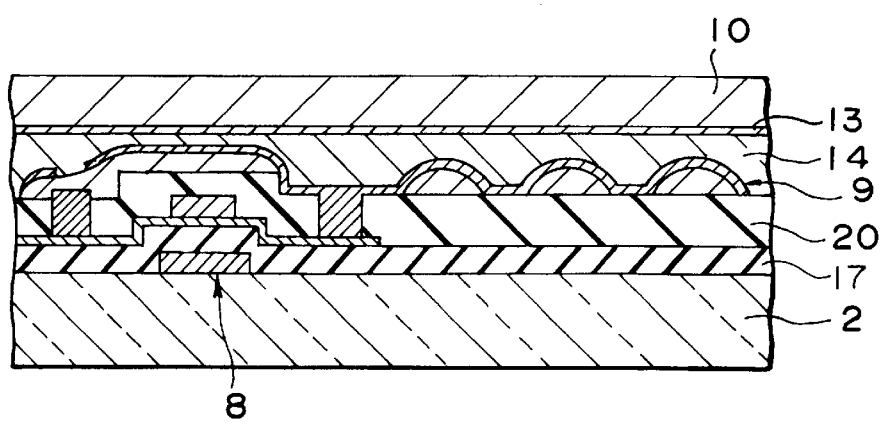
Figure 3D:
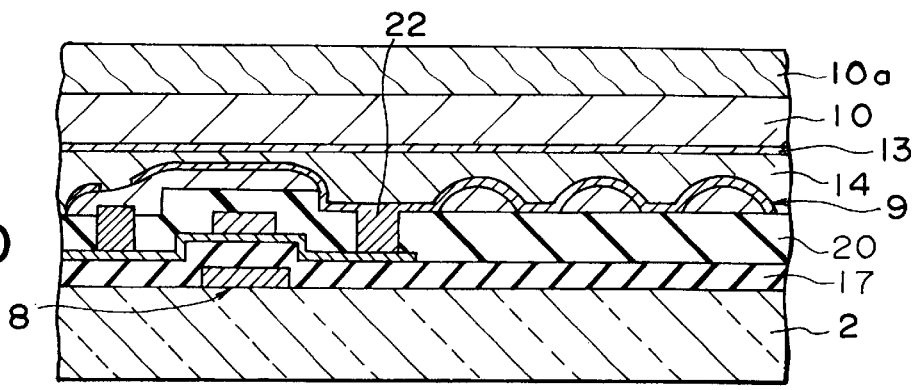
Figure 3E:
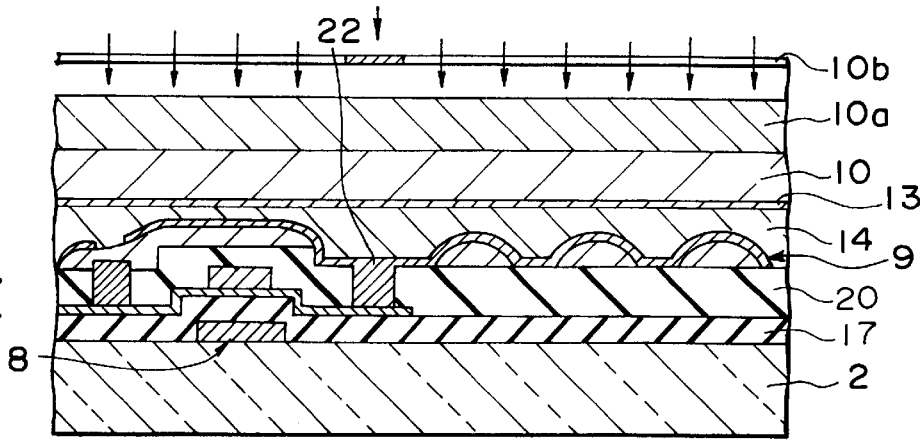

The process proceeds to the step shown in FIG. 3C, in which the quarter-wavelength-plate layer 10 is actually formed on the undercoat alignment layer 13. Specifically, the undercoat alignment layer 13 is coated with high-molecular liquid crystal so that it has a predetermined thickness. This high-molecular liquid crystal is a material whose phase can change between the high-temperature nematic-liquid-crystal phase and the low-temperature glass solid phase, which are positioned before and after a predetermined transition point. For example, this high-molecular liquid crystal is in its glass condition at room temperature, and is preferably a principal chain type or side chain type having a transition point at 100° C. or higher. This high-molecular liquid crystal is a transparent material optically having no absorption in the range of visibility. This high-molecular liquid crystal is dissolved in an organic solvent (e.g., mixed solution of cyclohexane and n-butanon). The obtained solution is applied to the surface of the undercoat alignment layer 13 by spin coating. For the spin coating, by appropriately setting conditions such as the concentration of the obtained solution and a spin rotation speed, the thickness of a formed thin film can generate a phase difference of $\lambda/4$ in the range of visibility, where $\lambda$ represents the wavelength of incident light. Subsequently, by performing a thermal process in which the substrate 2 is once heated to the transition point or higher before is cooled to room temperature not more than the transition point so that the formed film of high-molecular liquid crystal is aligned in the alignment direction, the quarter-wavelength-plate layer 10 is formed. For example, high-molecular liquid crystal having a transition point at 100° C. or higher and liquid crystal molecules included in principal chains and side chains of polymers is heated and cooled. Liquid crystal molecules included in the high-molecular liquid crystal in the film forming phase are in random condition, while the liquid crystal molecules after cooling are aligned along the alignment direction to provide the desired uniaxially optical anisotropy. Specifically, the substrate 2, on which the high-molecular liquid crystal is applied, is heated in an oven with its temperature previously set at the nematic phase temperature or isotropic phase temperature. Subsequently, the substrate 2 is cooled to the room temperature. This aligns the coated high-molecular liquid crystal along the alignment direction of the undercoat alignment layer 13, which has been aligned.

Figure 3F:
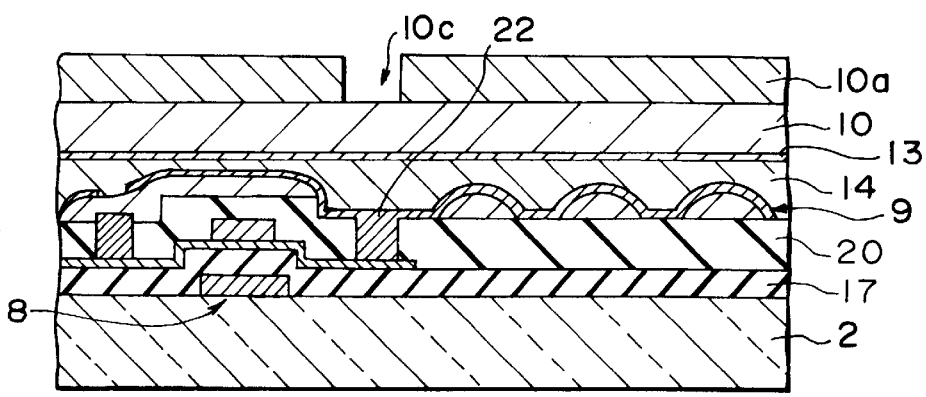
Figure 3G:
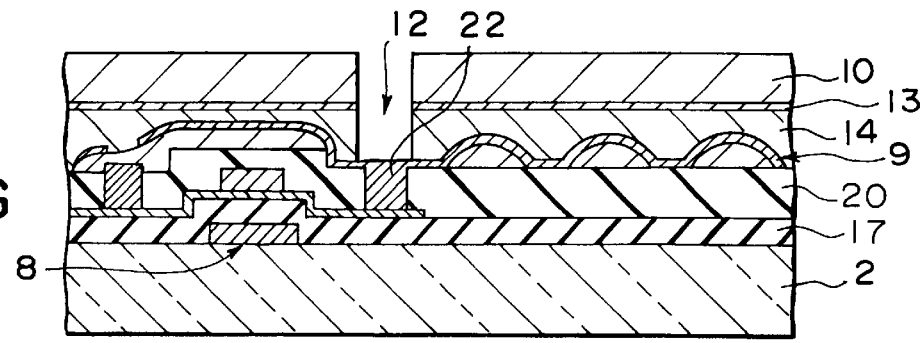

As shown in FIGS. 3D to 3G, a contact hole is formed in the quarter-wavelength-plate layer 10, the undercoat alignment layer 13 and the planarizing layer 14 so as to reach the drain electrode 22 of the lower thin film transistor 8. Initially, in the step shown in FIG. 3D, a photosensitive film 10a is applied to the whole of the surface of the quarter-wavelength-plate layer 10. The process proceeds to the step shown in FIG. 3E, in which the photosensitive film 10a is exposed. For example, by using a mask 10a to expose the photosensitive film 10a, a part thereof to which light is emitted hardens, while a part thereof to which light is not emitted does not harden and remains. In this embodiment, the photosensitive film 10a, which is water-soluble, is used. The process proceeds to the step shown in FIG. 3F, in which water etc. are used to develop the photosensitive film 10a so that the non-hardening part is removed. This lithography step performs the patterning of the photosensitive film 10a in the desired shape. In other words, a window 10C is formed in the photosensitive film 10a so as to correspond to the drain electrode 22, as shown in FIG. 3F. The process proceeds to the step shown in FIG. 3G, in which the quarter-wavelength-plate layer 10, the undercoat alignment layer 13 and the planarizing layer 14 are etched with the patterned photosensitive film 10a as a mask to form the contact hole. Dry etching may be employed as this etching.

Figure 3H:
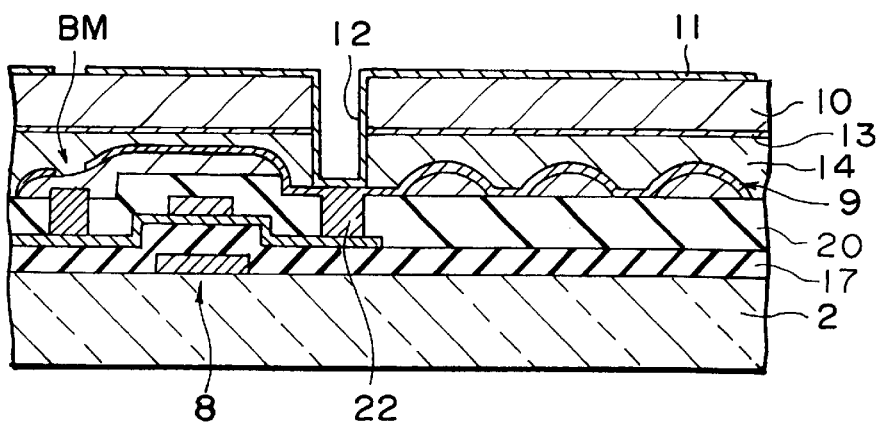

The process proceeds to the step shown in FIG. 3H, in which a pixel electrode 11 is formed on the quarter-wavelength-plate layer 10 so as to be connected by the contact hole 12 to the drain electrode 22 of the thin film transistor 8. For example, by using sputtering to form a transparent conductive film composed of ITO, and patterning the film in a predetermined shape by etching, the pixel electrode 11 can be formed. From FIG. 3H, it is clear that a ground black matrix BM corresponds to the border between two adjacent pixel electrodes 11.

Figure 3I:
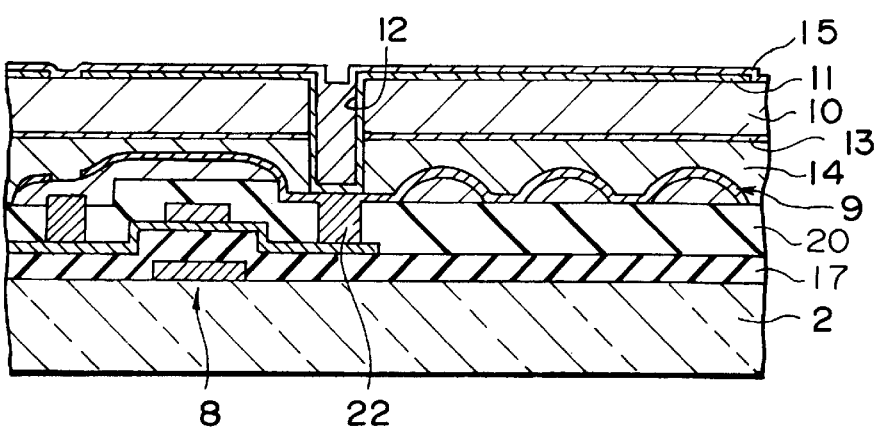

The process proceeds to the step shown in FIG. 3I, in which an alignment layer 15 is formed to cover the pixel electrode 11. For example, forming a polyimide film for vertical alignment provides the desired alignment layer 15.

Figure 3J:
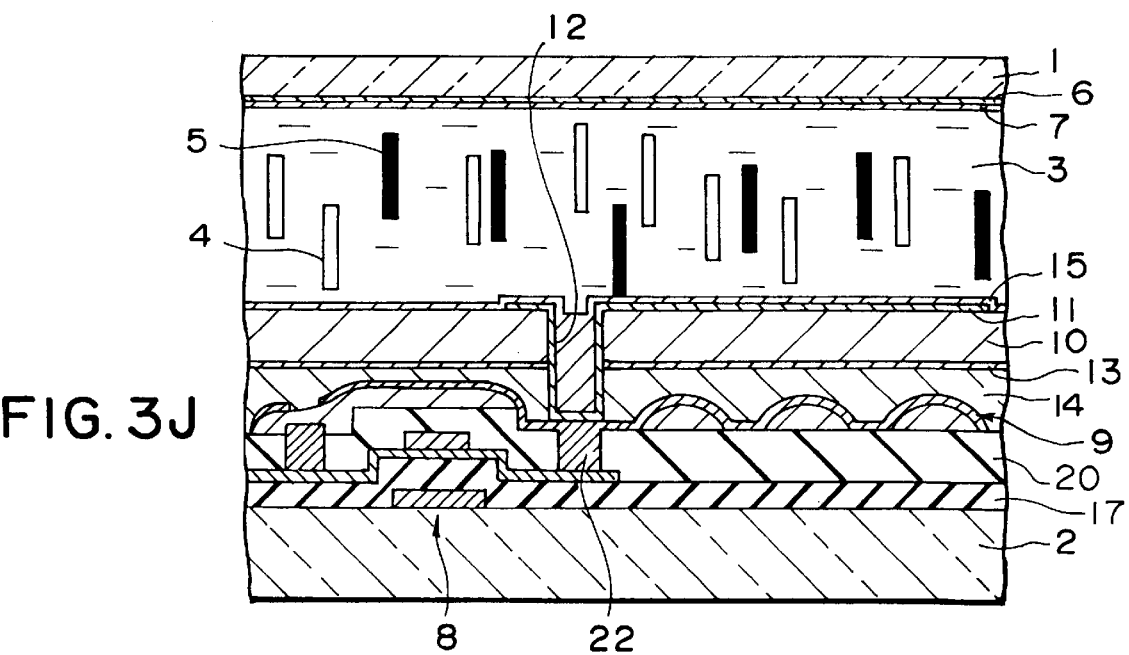

In the final step shown in FIG. 3J, a transparent electrode 1 on which a counter electrode 6 and an alignment layer 7 are previously formed is joined to the insulating substrate 2, with a predetermined gap provided between both substrates. Encapsulating guest-host liquid crystal 3 in the gap between both substrates 1 and 2 completes a reflective guest-host-liquid-crystal display device. The guest-host liquid crystal is such that a dichroic dye 5 as a guest is added to nematic liquid crystal 4 as a host.

What is claimed is:

1. A reflective guest-host-liquid crystal display device comprising:

first and second substrates jointed to each other, with a predetermined gap provided therebetween; and guest-host liquid crystal including a dichroic dye, said guest-host liquid crystal held in the gap, wherein said first substrate includes: switching devices; a light-reflection layer having a reflective metal film formed above a light-shielding resin film; a quarter-wavelength plate layer, formed above said switching devices and said light-reflection layer, having a contact hole in conduction with said switching devices; pixel electrodes, formed by patterning the surface of said quarter-wavelength-plate layer, connected to said switching devices by the contact hole; and a light-shielding black matrix formed from the light shielding resin film and positioned to correspond to the border of each pixel electrode by having the reflective metal film correspond to said pixel electrodes, and said second substrate has a counter electrode formed on the outer surface thereof.

2. A reflective guest-host-liquid-crystal display device according to claim 1, wherein said light-shielding resin film is a photosensitive resin film having a black pigment or dye added therein.

3. A reflective guest-host-liquid crystal display device according to claim 1, further comprising a gap between said light-reflection layer and said quarter-wavelength-plate layer filled with a planarizing layer.

4. A reflective guest-host-liquid-crystal display device according to claim 3, wherein said planarizing layer is colored so as to correspond to each pixel electrode, whereby functioning as a color filter.

* * * * *